Nov. 5, 1935.  R. E. REVETT  2,020,160
AUTOMATIC CONTROL AND SAFETY APPARATUS FOR USE ON POWER DRIVEN VEHICLES
Filed May 3, 1934  3 Sheets-Sheet 2
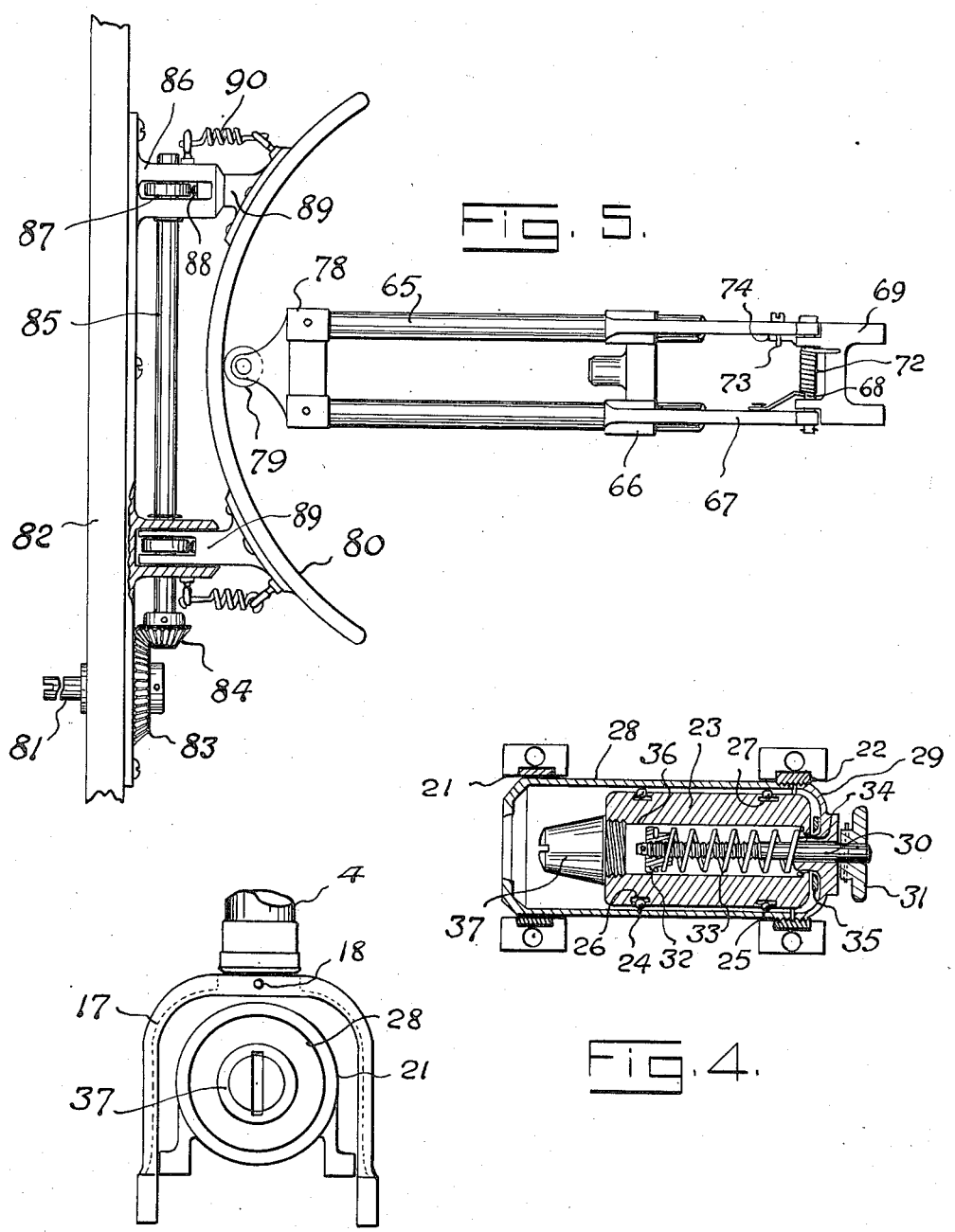
INVENTOR
Richard E. Revett
BY
ATTORNEY Nov. 5, 1935.  R. E. REVETT  2,020,160
AUTOMATIC CONTROL AND SAFETY APPARATUS FOR USE ON POWER DRIVEN VEHICLES
Filed May 3, 1934  3 Sheets-Sheet 3
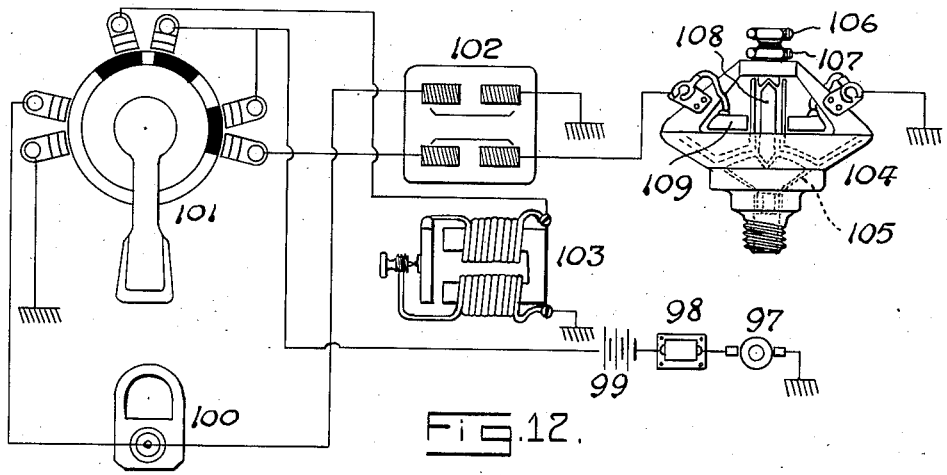
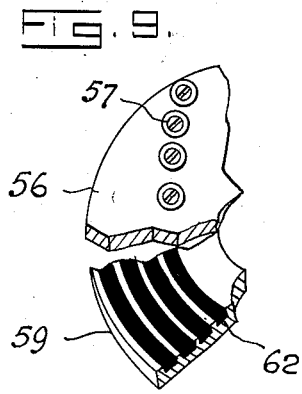
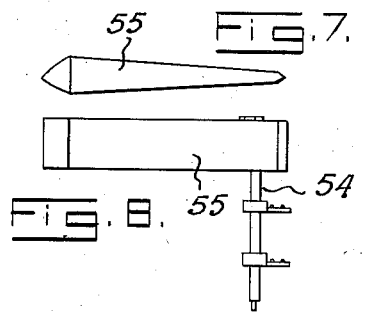
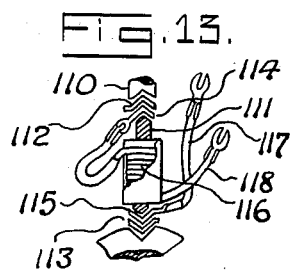
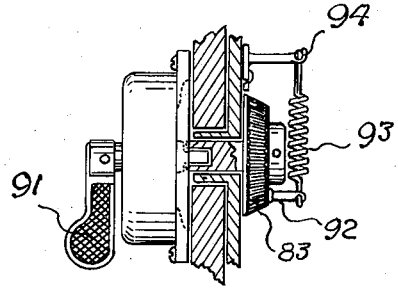
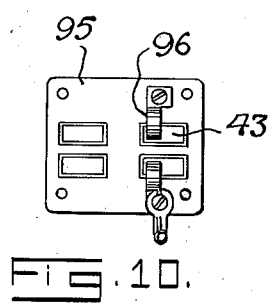
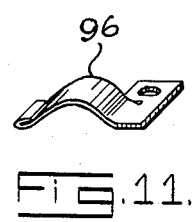
INVENTOR
Richard E. Revett
BY
*A. Wallace White*
ATTORNEY Patented Nov. 5, 1935

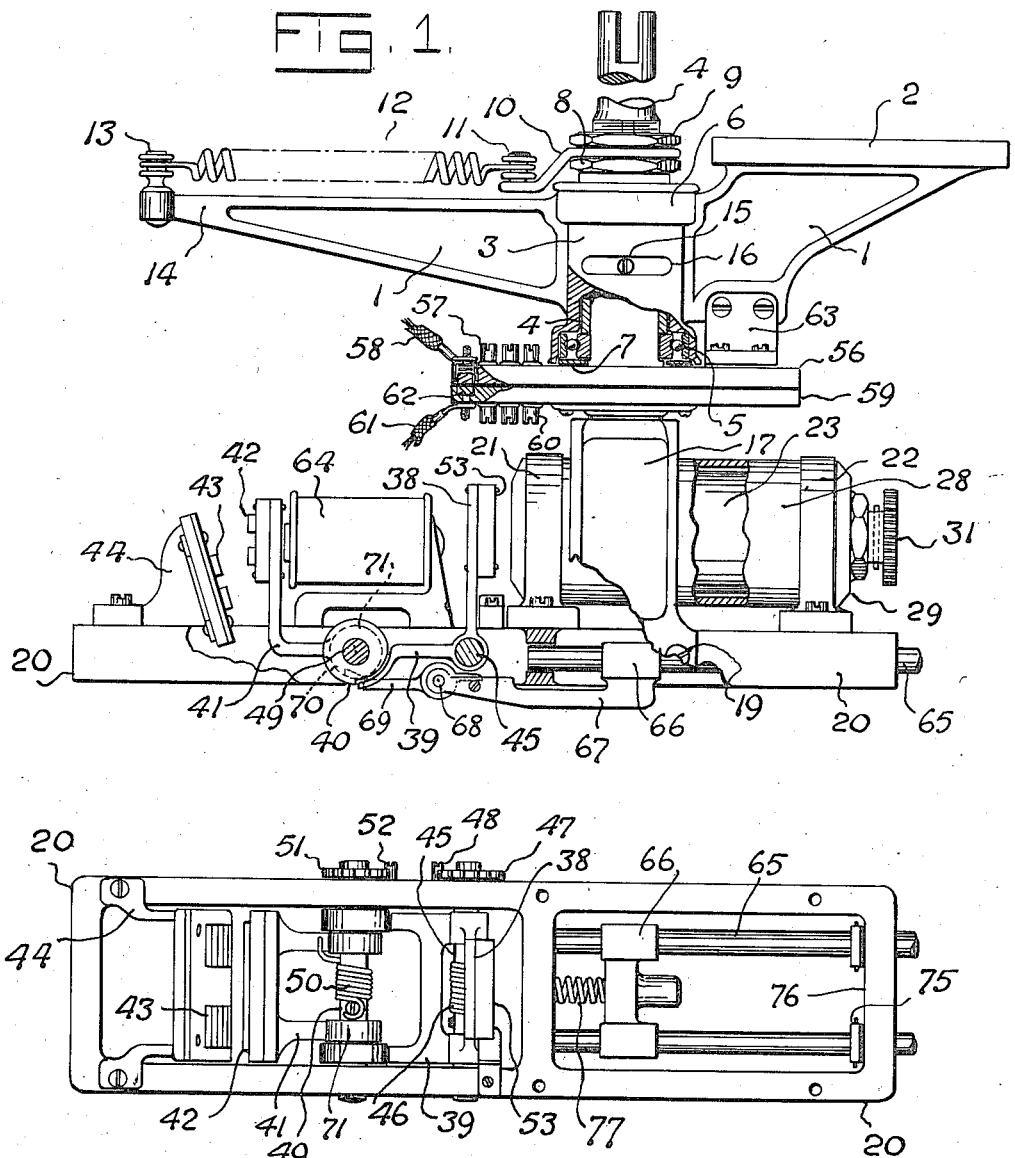

2,020,160

UNITED STATES PATENT OFFICE 2,020,160

AUTOMATIC CONTROL AND SAFETY APPARATUS FOR USE ON POWER DRIVEN VEHICLES

Richard E. Revett, Lima, Peru

Application May 3, 1934, Serial No. 723,711

20 Claims. (Cl. 180—82)

My invention relates to improvements in safety apparatus for the prevention of fire, due to collision, crash or other sudden stoppage of a power driven vehicle.

The improved apparatus is of the known type in which a weight or inert mass is adapted to function upon the sudden stoppage of a vehicle by a collision, crash or other accident and is adapted to automatically break the ignition circuit, to actuate fire-extinguishing mechanism, and if desired, to cut off the fuel supply, to apply brakes—in the case of road or rail vehicle—and to actuate other mechanism for the prevention of fire or for other safety purposes.

My improved apparatus is adapted for use on aircraft, on road or rail vehicles and on motorboats and other watercraft.

One object of my invention is to provide an apparatus having an inert mass of improved construction and adapted to function in a new and improved manner.

Another object of my invention is to provide automatic means for maintaining the apparatus —or certain parts thereof—normally in the line of flight or of travel of the vehicle to which it is applied.

Still another object of my invention is to provide new or improved means whereby the apparatus may be set or re-set to its normal position, ready for operation, by mechanical and also by electrical means or by one or other of these means individually.

With these and other objects in view my invention consists in the novel construction and arrangement of parts hereinafter described, illustrated in the accompanying drawings, and particularly pointed out in the appended claims, it being understood that various changes in the form and operation and in the minor details of construction may be made without departing from the spirit of the invention or sacrificing any of the advantages thereof.

Fig. 1 is a side view of the main portion of the apparatus—partly broken away to show the internal construction; Fig. 2 is a plan view showing the lower part of the structure shown at Fig. 1; Fig. 3 is a detail front view showing the saddle piece with the inert mass therein; Fig. 4 is a horizontal section of the inert mass and its casing; Fig. 5 is a detail inverted plan view showing mechanical means for restoring the apparatus to its set or operative position; Fig. 6 is a detail view partly in section showing the ignition switch; Fig. 7 is a detail plan view showing the direction-maintaining vane; Fig. 8 is a side view thereof; Fig. 9 is a fragmentary perspective view showing portions of the fixed and movable discs with electric contacts therein; Fig. 10 is a detail view showing the underside of the electrical contacts engaged by a control member on actuation of the apparatus; Fig. 11 is an enlarged detail perspective view showing one of the spring terminals engaging one of the contacts of Fig. 10; Fig. 12 is a diagrammatic view showing the electrical connections in combination with an automatic sprinkler control; and Fig. 13 is a detail view showing a modified form of the sprinkler control.

The apparatus shown more particularly at Figs. 1 and 2 comprises a fixed frame or bracket 1 which may be secured to the vehicle in any suitable or convenient manner for example by means of the flange or plate portion 2 which—in the case of an automobile—may be installed beneath the instrument board or in other suitable or convenient position, and forming a part of the frame 1 is a sleeve 3 within which there is mounted a vertical shaft 4 free to turn in a ball bearing race 5 at the lower end of the sleeve and in a similar ball race in the upper portion 6 of the sleeve, and felt washers or packing 7 may be provided for the exclusion of dust and for the proper lubrication of the shaft within the sleeve. Above the sleeve 3, the shaft 4 is provided with a nut 8 for the adjustment of the upper ball race and cooperating with this nut 8 is a second nut 9, and between these nuts 8, 9, a collar 10 is clamped. Provided on this collar 10 is a post 11 carrying one end of a spring 12 whose opposite end is connected to a post 13 on an extension 14 of the frame 1, while a screw pin 15 on the shaft 4 engages a slot 16 in the sleeve 3 so that the angular movement of the shaft 4 within the sleeve 3 is limited by the pin and slot, and the spring 12 normally retains the shaft in such a position that the pin 15 is midway between the ends of the said slot, and the length of the said slot is preferably such that the shaft 4 may turn through approximately 60 degrees in either direction from the central position shown at Fig. 1.

The lower extremity of the shaft 4 has a saddle piece 17 (Fig. 3) secured thereon by means of a pin 18 and the lower internal side faces of the saddle piece 17 engage the side edges of a floating base piece 20 to which they are rigidly secured by means of screws 19 (Fig. 1).

Mounted on the floating base 20 in alignment with the saddle piece 17 are two collars 21, 22 which carry a weight or inert mass 23 of cylindrical form and having external annular ball bearings 24, 25 carried in annular grooves 26, 27 in the external circumference of the mass and engaging the internal wall of a hollow cylindrical casing 28 which latter is screw threaded into the said collar 22 and fits snugly within the collar 21. The said collar 22 is internally screw threaded for the reception of the said casing and also for the reception of an end cover 29 having a central opening for the passage of a bolt 30 which extends into a central hollow core or recess 36 in the mass 23 and has on its outer end a knob 31. The inner extremity of the bolt 30 is fitted with an adjustable and shouldered nut 32, and a spring 33 extends between the shoulder on the said nut 32 and an internal annular ledge 34 at the extremity of the recess 36 in the mass 23. A washer 35 is interposed between the extremity of the mass 23 and the end cover 29 and this washer is normally held between these parts by the action of the spring 33. The washer 35 being made of soft leather and serving as a shock absorber for the mass 23.

At the end thereof remote from the internal shoulder 34 the hollow core or recess 36 in the mass 23 is internally screw threaded for the reception of a plug or nose 37 which latter is adapted to contact with a face plate 53 on an arm 38 of a double armed lever device whose second arm 39 normally engages a tooth 40 connected with a pivoted control member 41 having electrical contact members 42 for engagement with electrical contacts 43 in a bracket 44 mounted on the said base 20. The lever device 38, 39 is mounted on a cross shaft 45 in the base 20 and has a spring 46 by means of which it is normally retained with the end of the arm 39 in position to engage the said tooth 40, one end of the spring 46 being anchored to the shaft 45 which latter is provided with an adjusting wheel 47 and a locking pin 48 so that the tension of the spring 46 may be accurately adjusted. The pivoted control member 41 is mounted upon a shaft 49 also mounted in the base 20 and a coil spring 50 on said shaft 49 tends to swing the member 41 towards the bracket 44, the spring 50 having one end anchored to the shaft 49 which latter is provided with an adjusting wheel 51 and a locking pin 52 so that the tension of this spring 50 may be accurately adjusted. In this manner the engagement of the arm 39 with the tooth 40 retains the pivoted member 41 in the position shown at Fig. 1 with its contacts 42 out of engagement with the contacts 43, and in the event of a collision, crash or other sudden stoppage of the vehicle carrying the apparatus, the mass 23 is thrown violently to the left—Fig. 4—against the action of the spring 33 so that the nose 37 strikes sharply against the face plate 53 on the arm 38 thus causing the latter and the arm 39 to turn in a counter-clockwise direction Fig. 1 against the action of the spring 46 thus releasing the nose 40 and permitting the control member 41 to turn in a counter-clockwise direction Fig. 1 under the action of the spring 50 thereby causing the engagement of the contacts 42 with the contacts 43 thus closing certain electrical circuits with the desired results.

The turning movement of the shaft 4 within the fixed sleeve 3 permits of the floating base 20 and of the inert mass 23 being brought into or maintained in line with the direction of flight or of travel of the vehicle, and the upper extremity or an extension 54 of the said shaft 4 may be fitted with a vane 55 Figs. 7 and 8—in the case of aircraft—for the purpose of automatically turning the floating base 20 to retain the inert mass 23 with its center line always directly in the line of flight.

In the case of automobiles and certain other vehicles the shaft 4 may be connected by suitable means (not shown) with the steering gear of the vehicle for the automatic adjustment of the floating base 20 to the line of travel.

Referring to Figs. 1 and 9 of the drawings, electrical connection between the stationary and movable parts of the apparatus is effected through the medium of an upper insulated disc 56 having a series of binding posts 57 each connected with a carbon plug extending to the under surface of the disc, these posts being connected with various leads 58, and the lower surface of the disc 56 being in contact with the upper surface of a disc 59 of insulating material having a series of binding posts 60 connected with suitable leads 61 and with a series of concentric arc-shaped carbon strips 62 in the upper surface of the plate 59 and each of these strips 62 contacts with only one of the plugs in the lower surface of the disc 56 so that the various circuits remain uninterrupted during the relative movement of the discs 56, 59 which latter disc rotates with the shaft 4 and saddle piece 17 while the disc 56 is connected by means of brackets 63 with the frame 1 and in this manner the use of flexible connection between the movable and stationary parts of the apparatus is unnecessary.

For restoring the apparatus to its set or "ready" position mechanical or electrical mechanism, or both mechanical and electrical mechanism, may be employed, and a suitable electro-magnet 64 is shown at Fig. 1, the arrangement and operation of the same being such that the operation of the ignition switch to start the motor of the vehicle automatically supplies current to the electro-magnet to turn the member 41 in a clockwise direction into the position shown at Fig. 1 so that the tooth 40 of the member 41 is automatically engaged by the retaining arm 39 in readiness for actuation of the safety device.

For the mechanical setting of the apparatus there are provided a pair of parallel slide rods 65 mounted in bearings in the base 20 and carrying a bracket 66 (Figs. 1, 2 and 5). Extending from the underside of the bracket 66 are two arms 67 carrying at their ends (their left hand ends Fig. 1, and their right hand ends Fig. 5) a pin 68 pivotally supporting a fork member 69 adapted to engage recesses 70 in sleeves 71 carrying the control member 41, the outer extremities of the fork member 69 being held upwards by a spring 72 on the pin 68 and the upward movement being limited by a pin 73 adapted to engage a tail piece 74 on the fork member. The slide rods 65 extend beyond the floating base 20 and their sliding movement in the bearings in such base is limited by collars 75 (Fig. 2) on said rods. These collars 75 are normally held in engagement with the inner edge 76 of the open base 20 by means of a spring 77. The outer ends of the rods 65 are connected by a crosshead 78 carrying a roller 79 adapted to engage an arc-shaped rail 80 (Fig. 5) normally arranged with the arc concentric to the axis of the shaft 4 so that angular movement of the shaft 4 within the sleeve 3 does not cause longitudinal movement of the rods 65 within the floating base 20. Referring to Fig. 5 of the drawings, the ignition switch is connected with a pin 81 mounted in a frame 82, and a bevel wheel 83 on said pin 81 is adapted to turn a smaller bevel wheel 84 secured on a shaft 85 which is mounted in brackets 86 secured to said frame 82. The shaft 85 carries a pair of cams or eccentric wheels 87 adapted to engage projections 88 carried on brackets 89 secured on the outer face of the rail 80. The said brackets 86 also serve as guides for the brackets 89 which latter are adapted to move with the said rail 80 by rotation of the cams 87 and engagement thereof with the projections 88, and the said projections 88 are held in contact with the said cams by means of springs 90 between the brackets 86 and 89. When the pin 81 is turned to close the ignition circuit of the vehicle, the rail 80 is moved to the right Fig. 5 through the medium of the bevel gears 83, 84 and the cams 87 so that the rails 65 and with them the fork member 69 are moved to the right in Fig. 5 and to the left in Figs. 1 and 2 so that the extremities of the fork member 69 by engaging the recesses 70 turn the member 71 into position for the engagement of the tooth 40 with the arm 39 so that the apparatus is retained in position ready to function in the event of a collision, crash or other accident.

In the detail view Fig. 6 the bevel gear 83 is shown in connection with a switch 91 and has a projecting post 92 connected to one end of a spring 93 whose opposite end is connected to a stationary post 94 so that partial movement of the switch is prevented and complete actuating movement is ensured. The detail views Figs. 10 and 11 show the back plate 95 of the contact bracket 44 and show the contact blocks 43 in combination with spring contact plates 96 for facilitating the connection with the proper terminals.

Referring to Fig. 12 of the drawings, the electrical equipment here shown comprises a generator 97, a relay 98, a storage battery 99, a magneto 100, a switch 101, the inertia control switch 102, magnetic coils 103 and an electrically operated sprinkler control device 104 comprising a release valve 105 held in place by means of a screw 106 and lock nut 107 in combination with a fusible bar 108 surrounded by a solenoid or resistance 109 in such manner that the actuation of the safety device in the event of a collision, crash or other accident actuates the switches to open the ignition circuit and to raise the temperature of the resistance 109 thus fusing the member 108 and causing the fire extinguishing sprinkler system to operate in the usual well known manner. The bar 108 may if desired be regulated or designed to retard or delay the sprinkler action so that in certain cases the apparatus may be reset after the actuation of the mass and before the sprinkler mechanism has time to commence its automatic operation.

The modified sprinkler device shown at Fig. 13 of the drawings comprises a securing bolt 110 which holds a fusible metal bar 111 in place while insulating conical washers 112, 113 and metallic terminals 114, 115 and a resistance 116 are interposed. These two metallic terminals 114, 115 make the connection between the fusible bar 111 and the feed conductors 117, 118 and in operation the increase in temperature in the resistance 116 fuses the member 111 and causes the actuation of the sprinkler system.

Although the drawings and above specification disclose the best mode in which I have contemplated embodying my invention, I desire to be in no way limited to the details of such disclosure for in the further practical application of my invention, many changes in form and construction and method of operation may be made as circumstances require or experience suggests without departing from the spirit of the invention within the scope of the appended claims.

What I claim is:

1. A safety apparatus for use on vehicles comprising an inert mass, a swinging member to be actuated by said mass, a retaining device on said member and a safety control element released by said device on movement of the said member under the action of said mass.

2. A safety apparatus for use on vehicles comprising an inert mass, a floating structure carrying said mass, a fixed frame supporting the said structure, means for moving the said structure relatively to the said frame to maintain the said mass in proper position relatively to the direction of travel of the vehicle, and means actuated by said mass in the event of sudden stoppage of the vehicle to break the ignition circuit and prevent fire.

3. A safety apparatus for use on vehicles comprising an inert mass, movable means supporting the mass and permitting straight line movement thereof, means for maintaining the mass with its line of movement parallel to the direction of travel of the vehicle, and means actuated by said mass in the event of sudden stoppage of the vehicle to break the ignition circuit and prevent fire.

4. A safety apparatus for use on vehicles comprising an inert mass, a spring to resist movement of the mass, means actuated by said mass in the event of sudden stoppage of the vehicle to break the ignition circuit and prevent fire, and mechanical connections for the manual restoration of said means to the "ready" or set position.

5. A safety apparatus for use on vehicles comprising an inert mass, a swinging member to be actuated by said mass, a retaining device on said member, a safety control element released by said device on movement of the said member under the action of said mass, and means for turning the said apparatus into positions corresponding to the direction of travel of the vehicle.

6. A safety apparatus for use on vehicles comprising an inert mass, a floating structure carrying said mass, a fixed frame supporting the said structure, means for moving the said structure relatively to the said frame to maintain the said mass in proper position relatively to the direction of travel of the vehicle, an ignition circuit control device actuated by said mass and mounted on said structure, and electrical connections between said structure and frame, for controlling the said circuit from said device.

7. A safety apparatus for use on vehicles comprising an inert mass, means supporting the mass and permitting straight line movement thereof, means for maintaining the mass with its line of movement parallel to the direction of travel of the vehicle, a movable member actuated by said mass, and a spring actuated control device released by said movable member.

8. A safety apparatus for use on vehicles comprising an inert mass, a spring to resist movement of the mass, means for the adjustment of said spring, means actuated by said mass in the event of sudden stoppage of the vehicle to break the ignition circuit and prevent fire, and mechanical connections for the manual restoration of said means to the "ready" or set position.

9. A safety apparatus for use on vehicles comprising an inert mass, a cylindrical casing enclosing the mass and permitting axial movement therein, a spring to resist such axial movement, a locking device actuated by the movement of said mass, a circuit control member released by said locking device and mechanical connections for the manual return of the circuit control member to the set position.

10. A safety apparatus for use on vehicles comprising an ignition switch, an inert mass for the prevention of fire in the event of sudden stoppage of the vehicle, a safety device actuated by automobile movement of said mass and means actuated by the operation of the ignition switch to restore the apparatus to the set position.

11. A safety apparatus for use on vehicles comprising an ignition switch, an inert mass, cooperating members actuated by the movement of said mass to break the ignition circuit in the event of sudden stoppage of the vehicle, and mechanical means for restoring the apparatus to the safety position on actuation of the ignition switch to close the ignition circuit.

12. A safety apparatus for use on vehicles comprising a frame fixed to the vehicle, a shaft free to turn in said frame, a floating structure carried by said shaft, an inert mass mounted on said structure, and a safety switch mounted on said structure and actuated by said mass to break the ignition circuit in the event of sudden stoppage of the vehicle.

13. A safety apparatus for use on vehicles comprising an inert mass, a cylindrical casing enclosing the mass and permitting axial movement therein, anti-friction bearings between the mass and the casing, a spring to resist such axial movement, a locking device actuated by the movement of said mass, a spring actuated circuit control member released by said locking device, and electro-magnetic means for the return of the circuit control member to the set position.

14. A safety apparatus for use on vehicles comprising an ignition switch, an inert mass for the prevention of fire in the event of sudden stoppage of the vehicle, a fixed cylinder enclosing the mass, a safety control element actuated by automatic movement of the mass in said cylinder, and electro-magnetic means actuated by the operation of the ignition switch to restore the apparatus to the set position.

15. A safety apparatus for use on vehicles comprising an ignition circuit and switch, an inert mass, means for maintaining the mass in proper position relative to the direction of travel of the vehicle, cooperating members actuated by the movement of said mass to break the said circuit in the event of sudden stoppage of the vehicle, and means for restoring the apparatus to the safety position on actuation of the ignition switch to close the ignition circuit.

16. A safety apparatus for use on vehicles comprising a frame fixed to the vehicle, a vertical shaft free to turn in said frame, a floating structure carried by said shaft, sliding electrical connections on said frame and structure, an inert mass mounted on said structure, means to permit movement of said mass in a straight line, and a safety switch mounted on said structure and actuated by said mass to break the ignition circuit in the event of sudden stoppage of the vehicle.

17. A safety apparatus for use on power driven aircraft comprising a fixed frame mounted on the craft, a shaft free to turn in said frame, a floating structure carried by said shaft, an inert mass mounted on said structure to control the ignition circuit in the event of sudden stoppage of the craft, and automatic means for maintaining the said structure in proper position relatively to the direction of flight.

18. A safety apparatus for use on power driven vehicles comprising an inert mass, guide means permitting movement of the mass only in a straight line, means for turning the mass so that its line of movement always remains parallel to the direction of travel of the vehicle, sprinkler means on the vehicle for the prevention of fire, and electrical means controlled by the movement of said mass to control the operation of the said sprinkler mechanism and to break the ignition circuit of the vehicle in the event of sudden stoppage thereof.

19. A safety apparatus for use on vehicles comprising a fixed frame mounted on the vehicle, a shaft free to turn in said frame, a floating structure secured to said shaft, an inert mass mounted on said structure to open the ignition circuit in the event of sudden stoppage of the vehicle, fire extinguishing means actuated automatically with the opening of said circuit, and automatic means for maintaining the said structure in proper position relatively to the direction of travel of the vehicle.

20. A safety apparatus for use on vehicles comprising an inert mass, cylindrical guide means permitting movement of the mass only in a straight line, means for turning the mass so that its line of movement always remains parallel to the direction of travel of the vehicle, sprinkler means on the vehicle for the prevention of fire, electrical connections controlled by the movement of said mass to control the operation of the said sprinkler mechanism and to break the ignition circuit of the vehicle in the event of sudden stoppage thereof, and mechanical and electro-magnetic means for setting the apparatus in operative position.

RICHARD E. REVETT.